(12) United States Patent  
Emigholz

(10) Patent No.: US 8,285,513 B2
(45) Date of Patent: Oct. 9, 2012

(54) METHOD AND SYSTEM OF USING INFERENTIAL MEASUREMENTS FOR ABNORMAL EVENT DETECTION IN CONTINUOUS INDUSTRIAL PROCESSES

(75) Inventor: Kenneth F. Emigholz, Chevy Chase, MD (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 490 days.

(21) Appl. No.: 12/070,253

(22) Filed: Feb. 15, 2008

(65) Prior Publication Data

US 2008/0281557 A1 Nov. 13, 2008

Related U.S. Application Data

(60) Provisional application No. 60/903,749, filed on Feb. 27, 2007.

(51) Int. Cl.
*G06F 11/30* (2006.01)
(52) U.S. Cl. ........... 702/179; 702/33; 702/34; 702/57; 702/58; 702/59; 702/81; 702/82; 702/83; 702/84; 702/105; 702/182; 702/183; 702/184; 702/185; 201/1; 703/3; 700/108; 700/109; 700/110; 700/209; 700/210; 700/211
(58) Field of Classification Search .............. 702/33, 702/34, 57–59, 81–84, 105, 179–184, 190–195; 201/1; 703/3; 700/108–110, 209–211
See application file for complete search history.

(56) References Cited

U.S. PATENT DOCUMENTS

| | | | |
|---|---|---|---|
| 3,773,627 A | 11/1973 | Weber et al. | |
| 3,855,074 A | 12/1974 | Mosler et al. | |
| 5,329,465 A * | 7/1994 | Arcella et al. | ............... 702/184 |
| 5,386,373 A | 1/1995 | Keeler et al. | |
| 5,548,528 A | 8/1996 | Keeler et al. | |
| 5,680,409 A | 10/1997 | Qin et al. | |
| 6,356,857 B1 | 3/2002 | Qin et al. | |
| 6,471,823 B1 | 10/2002 | Stewart | |
| 6,519,552 B1 | 2/2003 | Sampath et al. | |
| 6,556,939 B1 | 4/2003 | Wegerich | |
| 6,594,620 B1 | 7/2003 | Qin et al. | |
| 6,718,234 B1 | 4/2004 | Demoro et al. | |
| 6,772,099 B2 | 8/2004 | Merkin et al. | |
| 6,804,600 B1 | 10/2004 | Uluyol et al. | |
| 6,876,943 B2 | 4/2005 | Wegerich | |
| 6,904,391 B2 | 6/2005 | Merkin et al. | |

(Continued)

FOREIGN PATENT DOCUMENTS
WO 9504957 2/1995
(Continued)

OTHER PUBLICATIONS

Warne, K., G. Prasad, S. Rezvani, L. Maguire, Statistical and computational intelligence techniques for inferential model development: a comparative evaluation and a novel proposition for fusion, Engr. Appl. Art. Intell., v 17, 871-885 (May 2004).*

(Continued)

*Primary Examiner* — Sujoy Kundu
(74) *Attorney, Agent, or Firm* — Bruce M. Bordelon; Ronald D. Hartman

(57) ABSTRACT

The present invention is a method and system for detecting an abnormal on-line analysis or laboratory measurement and for predicting an abnormal quality excursion due to an abnormal process condition.

28 Claims, 13 Drawing Sheets

On-line System for Calculating Inferential Estimates for Abnormal Event Detection

U.S. PATENT DOCUMENTS

| | | | | |
|---|---|---|---|---|
| 7,937,164 | B2* | 5/2011 | Samardzija et al. | 700/28 |
| 2003/0065462 | A1* | 4/2003 | Potyrailo | 702/81 |
| 2004/0133398 | A1 | 7/2004 | Merkin et al. | |
| 2004/0254767 | A1 | 12/2004 | Merkin et al. | |
| 2006/0058898 | A1 | 3/2006 | Emigholz et al. | |
| 2006/0074599 | A1 | 4/2006 | Emigholz et al. | |
| 2006/0259163 | A1 | 11/2006 | Hsiung et al. | |

FOREIGN PATENT DOCUMENTS

| | | |
|---|---|---|
| WO | 2005008420 | 1/2005 |
| WO | 2006031635 | 3/2006 |
| WO | 2006031749 | 3/2006 |
| WO | 2006031750 | 3/2006 |

OTHER PUBLICATIONS

Cauvin et al. "CHEM: Advanced Decision Support Systems for Chemical/Petrochemical Process Industries." pp. 1027-1032. 2004.*

Voorakaranam et al. "Model Predictive Inferential Control with Application to a Composites Manufacturing Process". In: Industrial and Engineering Chemistry Research, vol. 38, No. 2, p. 433-450. Published Jul. 10, 1998. [retrieved on Jun. 17, 2008]. Retrieved from the Internet: <URL: http://it.che.wustl.edu/joseph/comps/sree_iec.pdf>.

Cardoso, J. et al., "Fuzzy Petri Nets: An Overview", 13th Word Congress of IFAC, vol. I: Identification II, Discrete Event Systems, San Francisco, CA, USA, Jun. 30-Jul. 5, 1996, pp. 443-448.

Erbay, A.S. & Upadhyaya, B.R., "A Personal Computer Based On-Line Signal Validation System for Nuclear Power Plants", Nuclear Technology, vol. 119, pp. 63075, Jul. 1997.

Gertler, J., "Survey of Model-Based Failure Detection and Isolation in Complex Plants," IEEE Control Systems Magazine, pp. 3-11, Dec. 1988.

Gertler, J. et al., "Isolation Enhanced Principal Component Analysis," AIChE Journal, vol. 45, Issue 2, pp. 323-334, 1999.

Gross, K.C., et al., "Application of a Model-Based Fault Detection System to Nuclear Plant Signals," International Conference on Intelligent System Application to Power Systems, Jul. 6-10, 1997, Seoul, Korea pp. 66-70.

Hobert, K E., & Upahyaya, B.R., "Empirical Process Modeling Technique for Signal Validation," Annals of Nuclear Energy, vol. 21, No. 7, pp. 387-403, 1994.

Long, T., et al., "Sensor Fusion and Failure Detection Using Virtual Sensors;" Proceedings of the 1999 American Control Conference; vol. 4; Jun. 1999; pp. 2417-2421.

Lorber, A., et al., "A Theoretical Foundation for the PLS Algorithm," Journal of Chemometrics, vol. 1, pp. 19-31, 1987.

Manus, H., "Validating Data from Smart Sensors," Control Engineering, pp. 63-66, Aug. 1994.

Piovoso, M.J., et al., "Process Data Chemometrics," IEEE Trans on Instrumentation and Measurement, vol. 41, No. 2, Apr. 1992, pp. 262-268.

Qin, J.S., and Li, W., "Detection, Identification, and Reconstruction of Faulty Sensors with Maximized Sensitivity," AIChE Journal, vol. 45 Issue 9, pp. 1963-1976, 1999.

Sowizral, H., "Virtual Sensors;" Proceedings SPIE International Society for Optical engineering, vol. 2409; Feb. 7-9, 1995; pp. 246-254.

Spoelder, H., "Virtual Instrumentation and Virtual Environments," IEEE Instrumentation and Measurement Magazine; vol. 2, Issue 3; Sep. 1999; pp. 14-19.

Upadhyaya, B.R., et al., "Multivariate Statistical Signal Processing Techniques for Fault Detection and Diagnosis," ISA Transactions, vol. 29, No. 4, pp. 79-95, 1990.

Venkatasubramanian, V., et al., "A Review of Process Fault Detection and Diagnosis," Parts 1, 2, & 3, Computers and Chemical engineering, vol. 27, 2003.

* cited by examiner

Example of Partially Plugged Sample Line

METHOD AND SYSTEM OF USING INFERENTIAL MEASUREMENTS FOR ABNORMAL EVENT DETECTION IN CONTINUOUS INDUSTRIAL PROCESSES

This Application claims the benefit of U.S. Provisional Application 60/903,749 filed Feb. 27, 2007.

FIELD OF THE INVENTION

This invention generally relates to the early detection of abnormal events in continuous industrial processes and more specifically relates to detecting incorrect measurement values of key operating parameters and to predicting future abnormal excursions of key operating parameters.

BACKGROUND OF THE INVENTION

When continuous industrial processes are operated near their economic optimum, they are operated at maximum or minimum limits of key operating parameters, such as the product quality specification. Consequently, knowing the current and expected future value of these parameters is very important to both the efficient operation of continuous industrial processes, such as refineries and chemical plants, as well as the prevention of abnormal events. For example, abnormal quality excursions can cause products to be outside their specification limits, cause the sudden malfunctioning of process equipment (such as pump cavitation due to vapor formation), and cause the degradation of process performance (such as loss of reaction from coke buildup on catalyst or loss of heat transfer from coke formation in furnace tubes).

The direct measurement of process stream quality and other key operating parameters can be both expensive and trouble prone. On-line analysis incurs both a high initial installation cost and a high maintenance cost. The on-line analysis often requires a dedicated process sampling system and an environmentally protected field shelter for the analysis equipment. Maintenance of this equipment can require specially trained personnel and high preventative maintenance effort; however it is often the case that maintenance is done only in response to a known problem with the on-line analyzers. Recent on-line analyzer systems incorporate standard samples for testing and calibration, and micro computers which run continual equipment diagnostics.

Often sites choose to make quality measurements using a laboratory analysis, either in conjunction with an on-line analysis or instead of an on-line analysis. Because of the extensive human involvement in taking field samples and then analyzing these samples, these lab analyses are usually infrequent (from daily to weekly), have significant normal variability, and have a high error rate.

To supplement the on-line analysis and laboratory analysis approaches, an inferential estimate of the quality parameter can be created from more readily available process measurements (primarily temperatures, pressures, and flows). The two traditional uses for inferential measurements are first to create a continuous estimate for the more slowly sampled analyzer value for use within closed loop process control applications, and second to validate analyzer and laboratory values. For these uses, by quickly updating the models with the actual on-line analyzer values or laboratory measurements, reasonably adequate performance can be achieved even with poor performing models. If the model has some power to estimate the next analyzer sample, it would behave no worse than using the last analyzer sample as an estimate for the next analyzer sample. However, except for ensuring new analyzer sample values are within minimum and maximum change limits, models that use rapid updating are inadequate for detecting abnormal analyzer sample values or for predicting abnormal quality excursions because of abnormal process events.

For these uses, there cannot be any issue distinguishing a real abnormal event from a defect in the model. This requires that only highest quality training data be used to build the model.

The majority of inferential measurements in the continuous process industries are developed by using process data driven methods such as neural nets, stepwise regression, partial least squares etc. where both the model structure and the model parameters are determined from operating data. Alternatively inferential measurements can be based on first principles engineering models where only the model parameters are determined from operating data. The quality of the models developed using these approaches is significantly affected by the quality of the data selected to build the model or to fit parameters in a first principles engineering model. The data selection, data analysis and data conditioning methods need to be tailored to the characteristics of data, rather than relying on generic approaches based on simple statistical assumptions. The failure to develop high quality inferential estimates in the continuous process industries can often be traced to ineffective data selection and data conditioning methods that don't match the characteristics of process data.

SUMMARY OF THE INVENTION

The objective of an abnormal event detection method or system, AED, (see e.g. US 2006/0058898) is to prevent the escalation of process and equipment problems into serious incidents. It achieves this by first providing the process operator with an early warning of a developing process problem or equipment problem, before the alarm system is activated, and then by providing the operator with key information for localizing and diagnosing the root cause of the problem.

In this invention, abnormal event detection is used to describe a method and system for detecting abnormal values of key operating parameters, particularly from on-line analyzers or laboratory analyses and for predicting an abnormal excursion in key process parameters, such as product quality, caused by recent abnormal process conditions. In summary, this invention includes: an inferential model for the abnormal event detection of operating parameter measures which combines pretreatment of the inputs to account for time dynamics with a prior art algorithm, such as PLS, a method for building high quality inferential models of operating parameters to detect abnormal values and to predict abnormal excursions (FIG. 1) and a system for online implementation of the model (shown in FIG. 2).

The system for online implementation includes:
1. preprocessing/time synchronizing the real-time data
2. calculating estimates of the current quality value, the future predicted quality value, and the estimate of the quality for use in a process control application
3. on-line updating of the model based on the actual measurement
4. interpreting the model estimate results
5. combining and summarizing the normal/abnormal status of multiple operating parameter measurements
6. providing abnormal event diagnostic information to the console operator
7. providing model diagnostic information to the maintenance engineer At the heart of this invention is an inferential model which estimates the value of a key operating parameter that is measured by an on-line analyzer or by a laboratory analysis. This model uses readily available process measurements such as temperatures, pressures and flows. There are many prior art algorithms for calculating such an inferential measurement model, such as neural networks, NN, partial least squares, PLS. and linear regression. However, these methods have difficulty incorporating the time dynamics which are characteristic of continuous industrial processes.

For the inferential model, this invention combines a prior art method, in particularly PLS but not limited to it, with three different pretreatments of the model input data to handle the time dynamics inherent in continuous industrial processes, a step known as time synchronization. Each form of time synchronization is structured to the particular use the model will be put to. This results in a two part model calculation, first calculating each time synchronized input and then combining these time synchronized inputs into an estimate of the output value. The different time synchronizations the inputs are done to estimate the current value of the analyzer/laboratory measurement, to predict the future value of the analyzer measurement, to be used as the input to a model based predictive control algorithm, or to be used as the input in standard control algorithm, such as a proportional integral derivative (PID) algorithm To train the inferential model, this invention includes a model development approach which creates a model training dataset structured to the characteristics of the data generated by continuous industrial processes. This includes:
  using normal operating data instead of designed experiment data
  accounting for protracted steady state operations at a small number of operating points
  accounting for process time dynamics
  accounting for the cross correlation among model inputs
  accounting for unmeasured effects on the analysis/operating parameter The on-line system preprocesses the data and calculates the inferential model in a manner consistent with the off-line model development. Additionally, the on-line system includes a method for adapting the model in real time and methods for interpreting the inferential model calculation and the analyzer/lab measurement as to whether an abnormal event is present or not. Once the operator receives an indication of an abnormal event, the system allows the operator to drill down to the underlying abnormal indication and the supporting data. The operator has the responsibility to decide on the correct action based on his analysis of the abnormal indication and the supporting data.

A typical abnormal event detection application could have 10-20 key process parameters/qualities within the process scope of an individual console operator. Using fuzzy petri nets, these key process parameter models are either:
  merged together to provide a single summary trend of the normal/abnormal status of all key process parameters or
  merged with other models in the same process sub-area to provide summary trends of the normal/abnormal status of that process sub-area.

In this manner, the on-line system can provide the process operator with a summarized normal/abnormal status of the process condition.

DETAILED DESCRIPTION OF THE PREFERRED EMBODIMENTS

The present invention provides a system for detecting abnormal events in key operating parameters, such as product quality, by using inferential models to:
  estimate the current value of key operating parameters
  provide early detection of invalid measurements of key operating parameters
  predict future abnormal excursions of key operating parameters Additionally it provides a method for creating the necessary inferential models and analysis mechanisms for the on-line system.

I. Inferential Measurement Abnormal Event Detection Objectives

With respect abnormal events and key parameter measurements such as product quality, it is important to know:
  Is an on-line analyzer or laboratory providing a correct value?

Is a model used in closed loop process control properly predicting the value of the quality?

Might there be a significant quality excursion due to a process change or an abnormal event?

What is the predicted future value of the analyzer or laboratory value?

II. On-line Abnormal Event Detection Using Inferential Models

Figure 2:
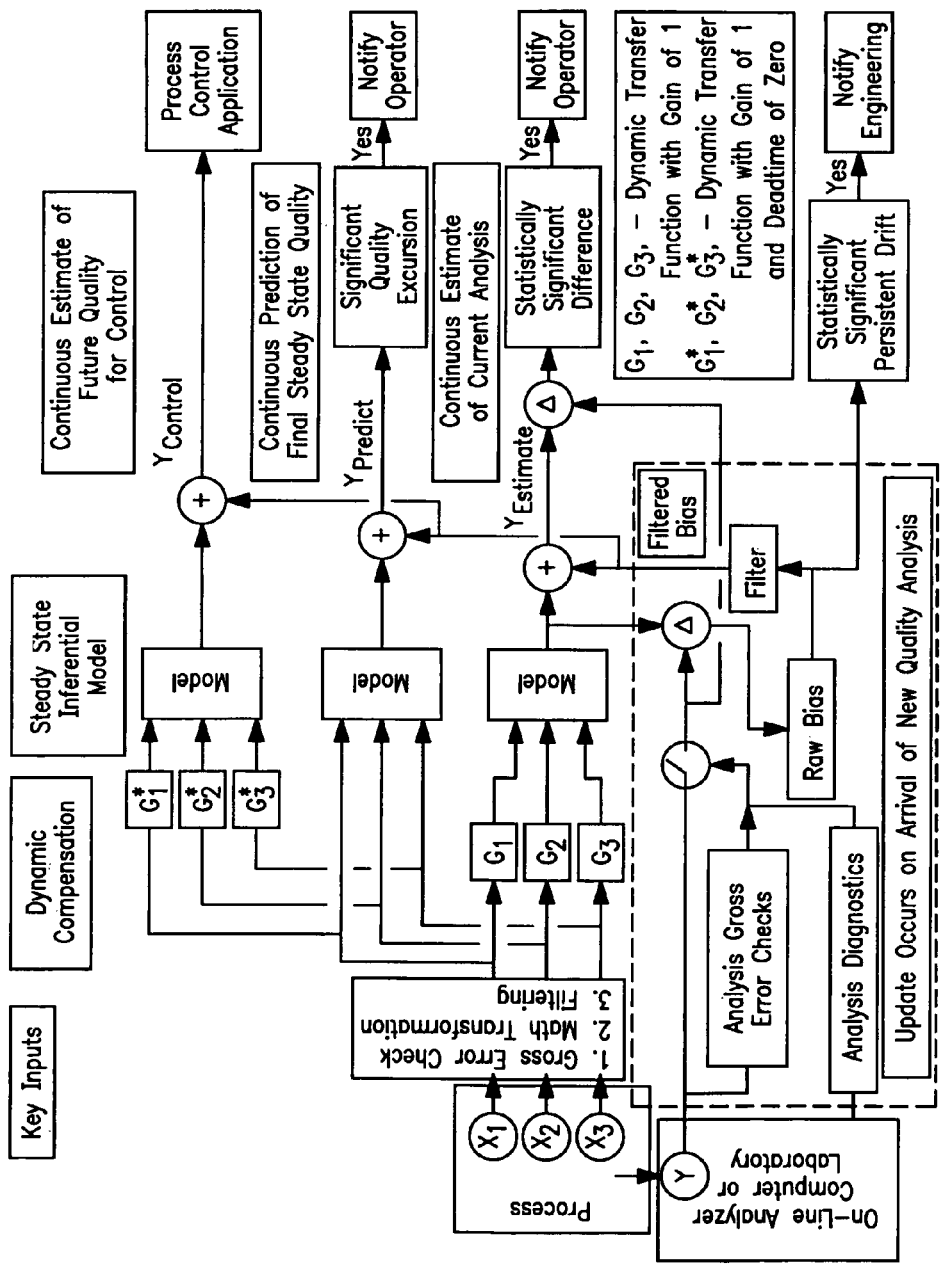
FIG. 2 shows on-line system for calculating inferential estimates for abnormal event detection. This figure shows the flow of the data and calculations for the online system portion of this invention

The model calculation process depicted in FIG. 2 can be segmented into four major portions:
A. Real-time data collection and preprocessing
B. Model and statistical significance calculations
C. Summarizing multiple model results for the process operator
D. Providing diagnostic displays for event analysis A. Real-Time Data Preprocessing Data is, brought into the system on several different time cycles. The standard process measurements (temperatures, pressures, flows etc.) are typically available at a high frequency and come into the system at a frequency of at least once per minute. Depending on the particular analysis, values from on-line analyzers are typically available every 10 to 30 minutes. Laboratory results are typically available between once/day to once/week. Except for laboratory results, all other measurements come into the system on a regular sample schedule. For laboratory results, there can be significant sample cycle variability because of the manual steps involved in collecting field samples and running the laboratory analyses.

The next step is to do gross error detection of the data. Depending on the field devices, there can be accompanying diagnostic information from field devices that support the HART® protocol or Foundation Field bus protocol (trademark of Hart Communications Foundation and stands for "Highway Addressable Remote Transducer"). The raw model input signals are checked against the zero and span of their transmitters to ensure that the signal is active and within the transmitter range. This check handles two different cases. Some DCS systems will use a "Bad Measurement" flag for input signals that are outside the 4-20 milliamp signal range. Other DCS systems will maintain the last good value within the 4-20 ma range until the input signal is once again within this range. Additionally, the system recognizes the flag used in the DCS to indicate that the field device is going through field maintenance or calibration, for example by setting the DCS measurement status to "offscan" or to "manual"

In addition to the minimum and maximum operating range checks, on-line analyzers can be run by computers which provide diagnostic information on the functioning of the field equipment. For on-line analyzers, the current sample value can be compared to the previous result, checking that the new value has changed enough to confirm that a new value has been transmitted and checking that the new value has not changed an unreasonable amount. This unreasonable change check can be supplemented by comparing the new value with the estimated value and checking that the Raw Bias has not changed by an unreasonable amount.

If the model inputs, the on-line analyzer values, or the laboratory values fail any of the gross error checks, the operator would be informed immediately. If the failure persists, the operator may need to take follow-up actions such as disabling the closed loop control application, request a field check of the analyzer, request an instrument check of an input, or request a new field sample be taken and analyzed by the laboratory.

Once the raw model input/output signals pass the gross error checks, any mathematical transforms needed for model inputs are calculated. The analyzer or lab result may also require a mathematical transformation to be consistent with the inferential model form.

Finally the model inputs are filtered to remove excessive noise. Measurements with spiky behavior can be processed with a spike rejection filter, such as a Union filter, while high frequency noise can be reduced with a high frequency rejection filter, typically an exponential filter.

B. Model and Statistical Significance Calculations

The inferential models for on-line analyzers and lab measurements are typically fitted using partial least squares (PLS) regression, neural nets, or stepwise linear regression. In FIG. 2, three types of abnormal events are being identified: first are near term problems with the quality measurement itself (using the $Y_{estimate}$ value), second are predictions of a significant quality excursion caused by abnormal events (using the $Y_{predicted}$ value), and third are long term drift problems in either the model or in the raw measurement (using the Raw Bias). As an additional use for the model, an estimate for use in a process control application, $Y_{control}$, can be calculated.

Calculating the Inferred Quality Measures, $Y_{estimate}$, $Y_{predicted}$, and $Y_{control}$ The models for calculating these three types of inferred quality measures consist of three major components:
time synchronization of the model inputs with the quality measurement
inferential model calculation
bias calculation and update As a byproduct of the bias calculation, the Raw Bias is analyzed to identify model calculation problems or analyzer calibration drift.

Time Synchronization

Quality measurements are usually the slowest to respond to process changes. Therefore the inputs to the model need to be time synchronized with the quality measurement. This time synchronization is indicated in FIG. 2 by the term "G". This is a dynamic model most simply represented by a differential difference equation or Laplace transform transfer function such as a first-order deadtime model:

$$\frac{Y(s)}{X(s)} = G(s) = \frac{e^{-TD*s}}{Tau*s+1} \qquad \text{Equation 1}$$

Where
X(s)—Laplace transform of the input signal
Y(s)—Laplace transform of the output signal
G(s)—symbol for the transfer function
$e^{-TD*s}$—Laplace transform for a pure deadtime of TD
Tau—time constant for a first order ordinary differential equation
s—Laplace transform parameter It is important to note that there is no steady state gain term in this model. All steady state relationships are incorporated in the inferential model parameters. During the model development stage this time synchronization model, G(s), is developed as the best single input, single output dynamic model between each candidate input and the quality measurement. It is not necessary to develop a multi-input single-output dynamic model.

Each of the three estimates of Y use different, but related time synchronizations:
In the $Y_{estimate}$ calculation, the dynamic model "G" is used to time synchronize the various inputs with the quality measurement.

In the $Y_{control}$ calculation, the dynamic model "G" is replaced with a dynamic model "G*" without a dead-time term $e^{-TD^*s}$, and where all of the other model parameters remain the same as for "G".

In the $Y_{predicted}$ calculation, the inputs are not time synchronized. Since there is no time synchronization, the $Y_{predicted}$ value is an estimate of the final steady state value for "Y" if all of the inputs remain at their current value.

Inferential Model Calculation

For all three types of inferential estimation, the inferential model is identical. Many different types of models, such as Kalman Filters, partial least squares, PLS, regression, neural nets or stepwise regression, can be used for the model calculation. However, the PLS model is preferred because the inputs are usually cross-correlated, the calculation is very simple, and the contribution of each input to the model result is easily determined. If the process has a strong non-linearity that could not easily be compensated for through a transform of the inputs, then a neural net model might be justified.

For the PLS model, there is no need to keep the complicated latent variable structure for the on-line calculation. In original latent variable form, the latent variables, $L_k$, are formed from linear combinations of the mean centered, unit variance scaled input variables, $X_i$:

$$L_k = a_{1,k} * \hat{X}_1 + a_{2,k} * \hat{X}_2 + \ldots + a_{j,k} * \hat{X}_j \quad \text{Equation 2}$$

$$Y_N = B_1 * L_{1,N} + B_2 * L_{2,N} \ldots + B_M * L_{M,N} + \text{LV\_Bias} \quad \text{Equation 3}$$

$$\hat{X}_i = \frac{(X_i - X_{i,mean})}{\sigma_i} \quad \text{Equation 4}$$

Where $a_{i,j}$—the latent variable loading (coefficient) for input "i" and latent variable "j"

$B_n$—regression coefficient for latent variable "n"

$L_k$—significant latent variables in the PLS model $Y_N$—PLS model output at time=N $X_{j,N}$ are the time synchronized raw or transformed inputs.

LV_Bias—model constant from model development

All of the factors and coefficients for each input can be combined into a single coefficient to make the generic PLS model calculation quite simple:

$$Y_N = A_1 * X_{1,N} + A_2 * X_{2,N} + \ldots A_k * X_{k,N} + \text{Bias} \quad \text{Equation 5}$$

$$A_j = \frac{\left(\sum_{n=1}^{M} (B_n * a_{j,n})\right)}{\sigma_j} \quad \text{Equation 6}$$

$$\text{Bias} = \text{LB\_Bias} - \frac{\left(\sum_{n=1}^{M} (B_n * a_{j,n} * X_{j,mean})\right)}{\sigma_j} \quad \text{Equation 7}$$

Where $\sigma_j$ – standard deviation of $X_j$

Bias Calculation and Update

The model for estimating the quality needs to be continually updated to compensate for model errors and for unmeasured or unmodeled effects that affect the actual measurement. The easiest approach is to update the additive bias term of the model. The initial value for the bias is the model constant determined during the model development stage. This is updated based on the residual between the model estimate and the actual value, referred to here as the "Raw Bias".

$$\text{Raw Bias}_N = \text{Quality Measurement}_N - \text{Quality Estimate}_N \quad \text{Equation 8}$$

This calculation is performed only when a new on-line analysis or lab analysis is available, all of the model inputs pass the gross error checks and the new Quality Measurement passes its gross error checks. Many on-line analyzers can only provide a new analysis value on a slow frequency, typically every 10-30 minutes depending on the analysis. A change in the analysis value can be used as the trigger indicating a new value has been delivered.

On-line analyzers are often run by computers that do diagnostic checks of the analysis equipment or occasionally run calibration samples. The bias update should not run if the diagnostic checks indicate a problem, if a calibration sample has been run instead of a process sample, if the sample results are unreasonable (no change in value between samples or too big of a change between samples), or the process is in an abnormal state (e.g. shutdown). Typically the time between the process stream sampling and the delivery of the on-line analysis results are consistent from sample to sample, so this deadtime will be a part of the time synchronization model.

If the new value for the quality measurement comes from a laboratory analysis, the time that the field sample was taken must be used to determine the correct comparison time for the Raw Bias calculation. The time between a manual field sample and the delivery of the laboratory results can vary significantly. Consequently accounting for this deadtime occurs once the laboratory results are ready. So if the field operator took the field sample at time "K", and the lab analysis value arrives at time "N" then $$\text{Raw Bias}_N = \text{Quality Measurement}_N - \text{Quality Estimate}_K \quad \text{Equation 9}$$

There are several traditional algorithms for updating the "Bias" from the "Raw Bias". Among these are processing the Raw Bias with a low pass filter, such as an exponential filter:

$$\text{Bias}_N = a * \text{Bias}_{N-1} + (1 - a) * \text{Raw Bias}_N \quad \text{Equation 10}$$

where $\quad$ Equation 11

$$a = \exp\left(\frac{-\text{sample time period}}{\text{filter time}}\right)$$

sample time period—time between analysis results filter time—exponential filter time constant As opposed to when the inferential model is used for a process control application, for abnormal event detection the filter time must be set to a long time interval in comparison to the sample time, typically greater than 20 times the sample time. For example, if an on-line analyzer has a 10 minute sample time then the filter time would be set greater than 3 hours, resulting in a value for "a" greater than 0.95.

Regardless of the specific algorithm for calculating the updated bias, the key requirement for abnormal event detection is the specification of a long filter time so that the effect of the abnormal event is not hidden by being absorbed into the bias update calculation. The more slowly the effect of an abnormal event appears in the quality measurement compared to the specified filter time, the progressively more difficult the event is to detect. Consequently, the most difficult abnormal event to detect is a slow drift in the measurement, requiring an equivalently slow filter time.

C. Using Fuzzy Nets to Normalize Model Results and Combine Models

For abnormal event detection, the numerical model results require interpretation for the console operator so that he knows when a result indicates that an abnormal event is likely. The mechanism for making this interpretation is to use a simple "fuzzifier" and the statistical variation of the model residuals, as represented by their standard deviations, to create an estimate of the likelihood of an abnormal event.

Figure 3:
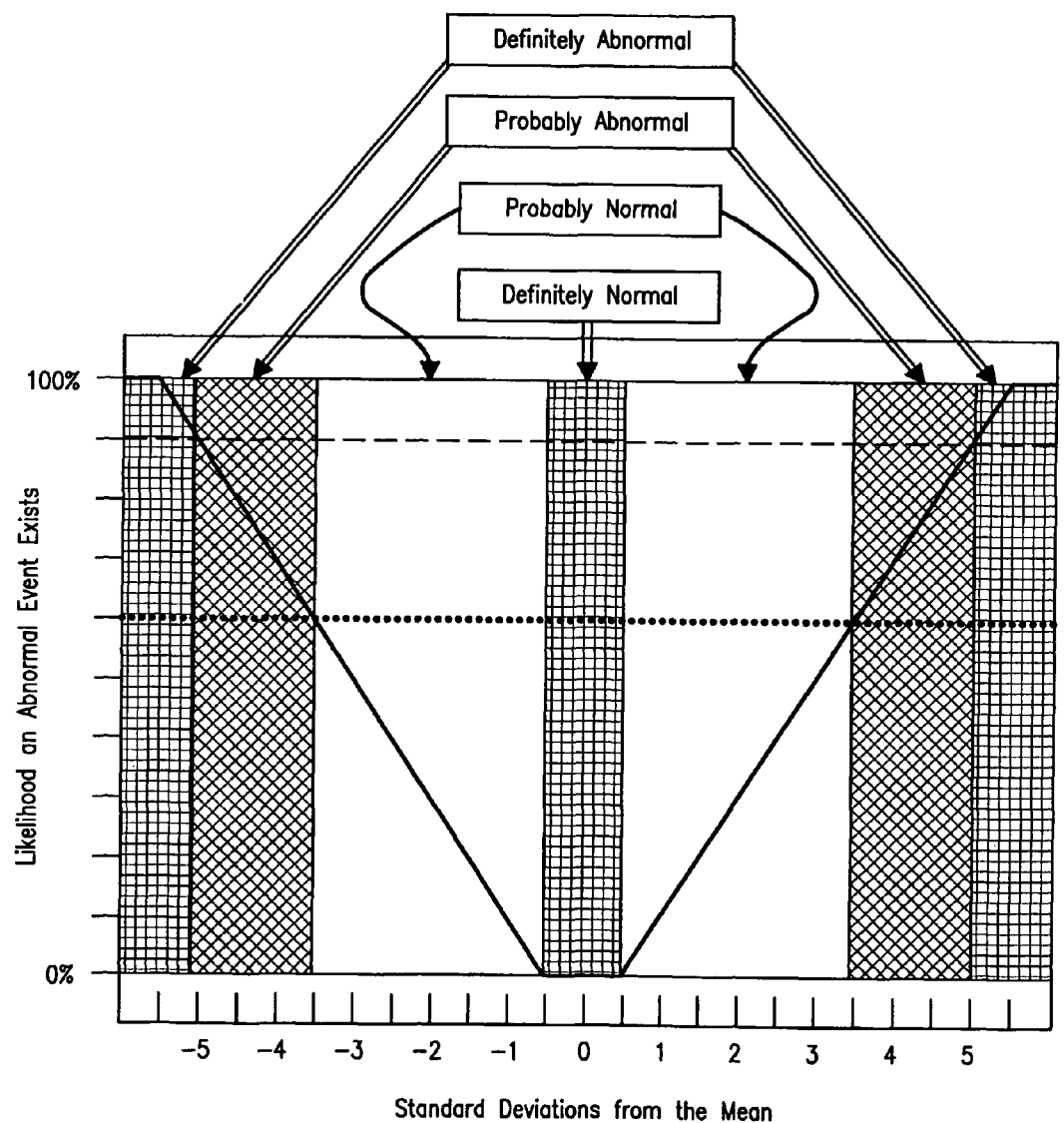
FIG. 3 shows the fuzzy conversion of statistical significance to likelihood of an abnormal event. This figure shows how the concept of statistical significant is used to normalize all model residuals into terms of the likelihood of an abnormal event by using fuzzy nets.

FIG. 3 shows an example of how this is done. The solid line is a mathematical function known as a "fuzzifier" and it converts a normalized residual of a model (normalized based on the standard deviation of the residual) into the likelihood that an abnormal event exists. The system user selects the region where the model residual results are definitely normal, in this example when the model residual is between −0.5 and 0.5 of the standard deviation, and when the model residual definitely indicates an abnormality (in this example when the model residual is above 5.5 standard deviations or below −5.5.standard deviations). The likelihood of an abnormality in between these areas is the linear interpolation from zero likelihood at ½ standard deviation to 100% likelihood at 5.5 standard deviations, and the equivalent calculation for negative values. The dotted and dashed lines are typical values of the likelihood (60% and 90%) where the console operator would be notified of the likelihood of an abnormal condition.

The specific probability of an abnormality depends on the data distribution function for the residual. This table 1 shows the percentage of normal values that will fall within various standard deviations of the mean value assuming that the data distribution function is Gaussian or Normal:

TABLE 1

| Standard Deviations | % Normal Values |
| --- | --- |
| 1 | 68.26895% |
| 2 | 95.44997% |
| 3 | 99.73002% |
| 3.5 | 99.95347% |
| 4 | 99.99367% |
| 5 | 99.99994% |

However the data distribution for the residual usually does not match a Gaussian or Normal distribution. Instead it is a composite of two probability distributions, the residual during normal/steady state operations and the residual distribution during moderate process upsets. In spite of this, the table can still help in conceptually guiding the proper settings.

Once model residuals have been converted to the common scale of "likelihood of the existence of an abnormal event" multiple model residuals can be combined to summarize large portions of the process operation. This is typically done by picking the largest likelihood of an abnormality among many models.

Detecting Quality Analysis Measurement Problems

Problems with the quality measurement are detected by looking for a statistically significant difference between the actual quality measurement, Y, and the estimated quality measurement, $Y_{estimate}$. This difference is the quality estimate residual. The statistically normal range for this residual should be calculated from the standard deviation of the residual during moderate process upsets. As in the example of FIG. 3, a practical definition of the probable "normal range" would be the limits between which 99.9% of the data would lay. This set of limits would correspond to approximately 3.5 standard deviations away from zero, the mean of this residual. These limits can be tuned to provide greater or less sensitivity.

Figure 4:
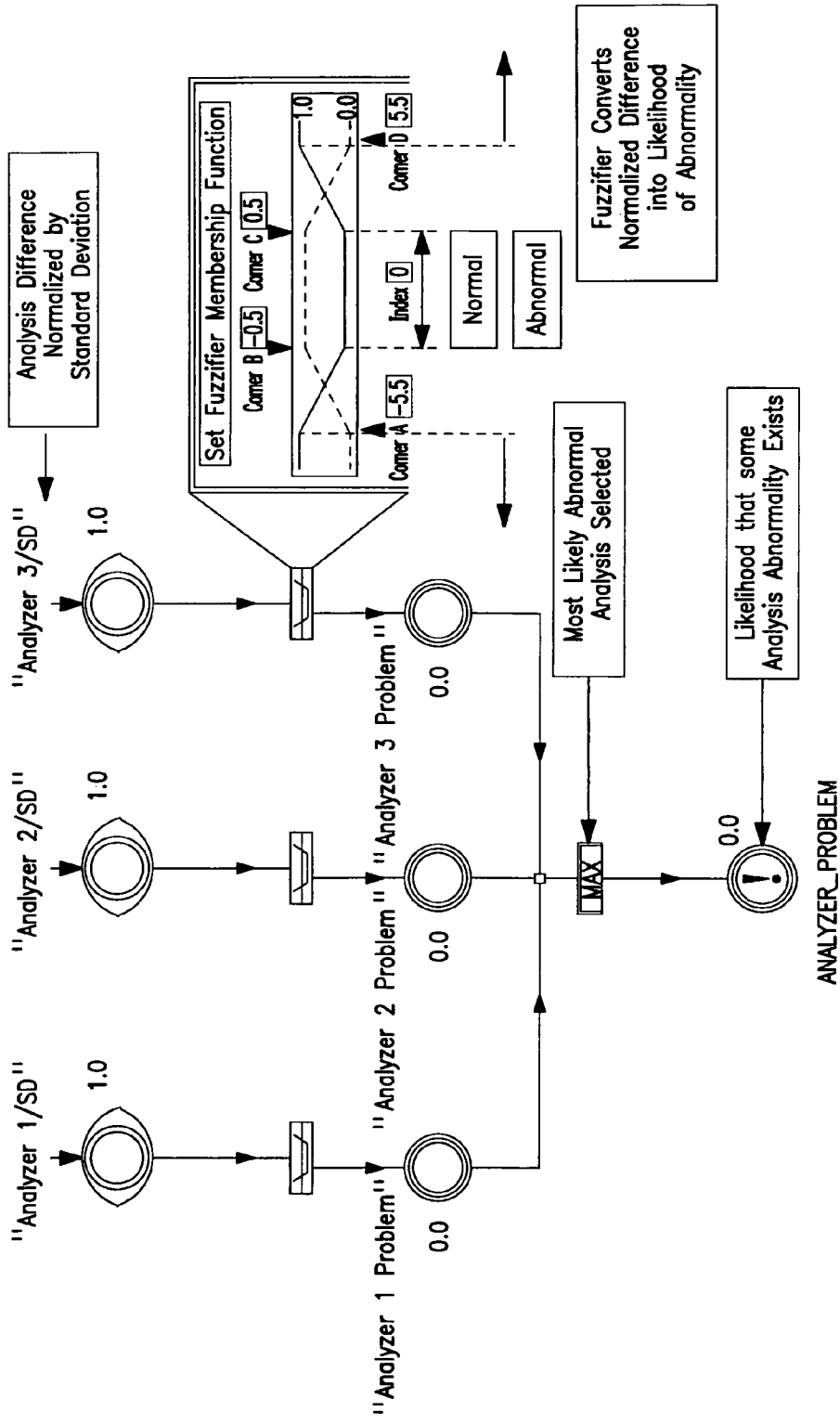
FIG. 4 shows a fuzzy net for summarizing likelihood of analysis abnormality. This figure shows how a composite likelihood of an abnormality among all analysis is calculated from the individual likelihoods.

For a typical abnormal event detection, AED, on-line implementation, a composite likelihood of an abnormality among all analyses is calculated from the individual likelihoods (See FIG. 4). The normalized quality estimate residuals (normalized by dividing residual by its standard deviation during normal operations) for all analyses are inputs into a fuzzy petri net. A fuzzifier converts each normalized residual into the likelihood of an abnormality, where values between −0.5 SD and 0.5 SD are 100% normal and values either greater than 5.5 SD or less than −5.5 SD are 100% abnormal. All analysis problems are then summarized together by selecting the highest likelihood of an abnormality. The operator would be given his first notification of a possible quality measurement problem when the likelihood went beyond 60%, which corresponds to 3.5 standard deviations.

Predicting Significant Quality Excursions

Figure 5:
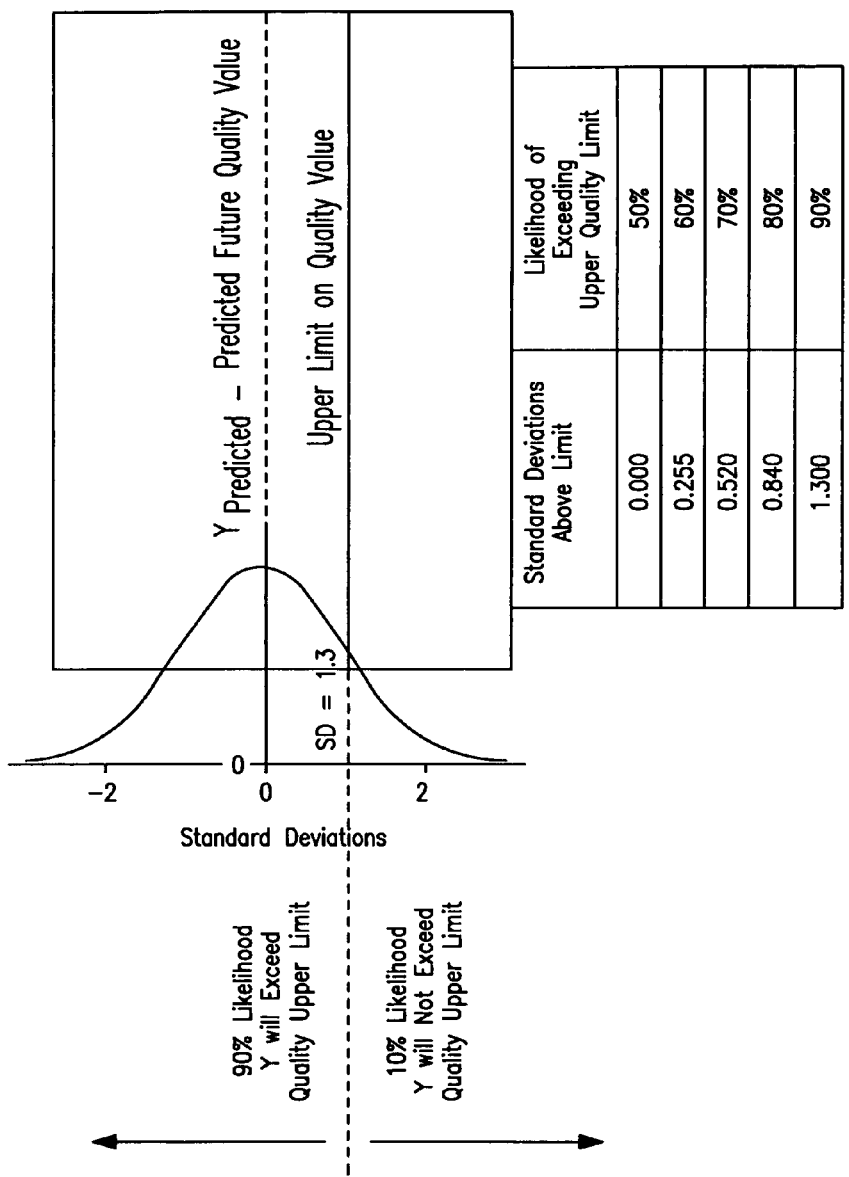
FIG. 5 shows an example of 90% likelihood that $Y_{predicted}$ will exceed upper quality limit. This figure shows how the data distribution of the $Y_{Predicted}$ is used to determine the limits for the fuzzy network in predicting abnormal analysis excursions.

The likelihood of future significant quality excursions is estimated by comparing the value of $Y_{predicted}$ to the quality limit. Depending on the quality of the model, there will be some amount of error between the value of $Y_{predicted}$ and the actual future value of Y. The best estimate of this error is the probability distribution of the quality estimate residual, ($Y_{estimate}$−Y). Assuming a Gaussian distribution, FIG. 5 depicts the scatter between the future value of Y and $Y_{predicted}$. In this example, $Y_{predicted}$ is 1.3 standard deviations higher than the upper quality limit. For this value of $Y_{predicted}$ 90% of the future values for Y will be above the upper quality limit and 10% will be below the upper quality limit. For particular likelihood estimates, this table 2 shows the offset above the upper limit needed for particular values of likelihood.

TABLE 2

| Standard Deviations Beyond Limit | Likelihood of Exceeding Limit |
| --- | --- |
| 0.000 | 50% |
| 0.255 | 60% |
| 0.520 | 70% |
| 0.840 | 80% |
| 1.300 | 90% |

Figure 6:
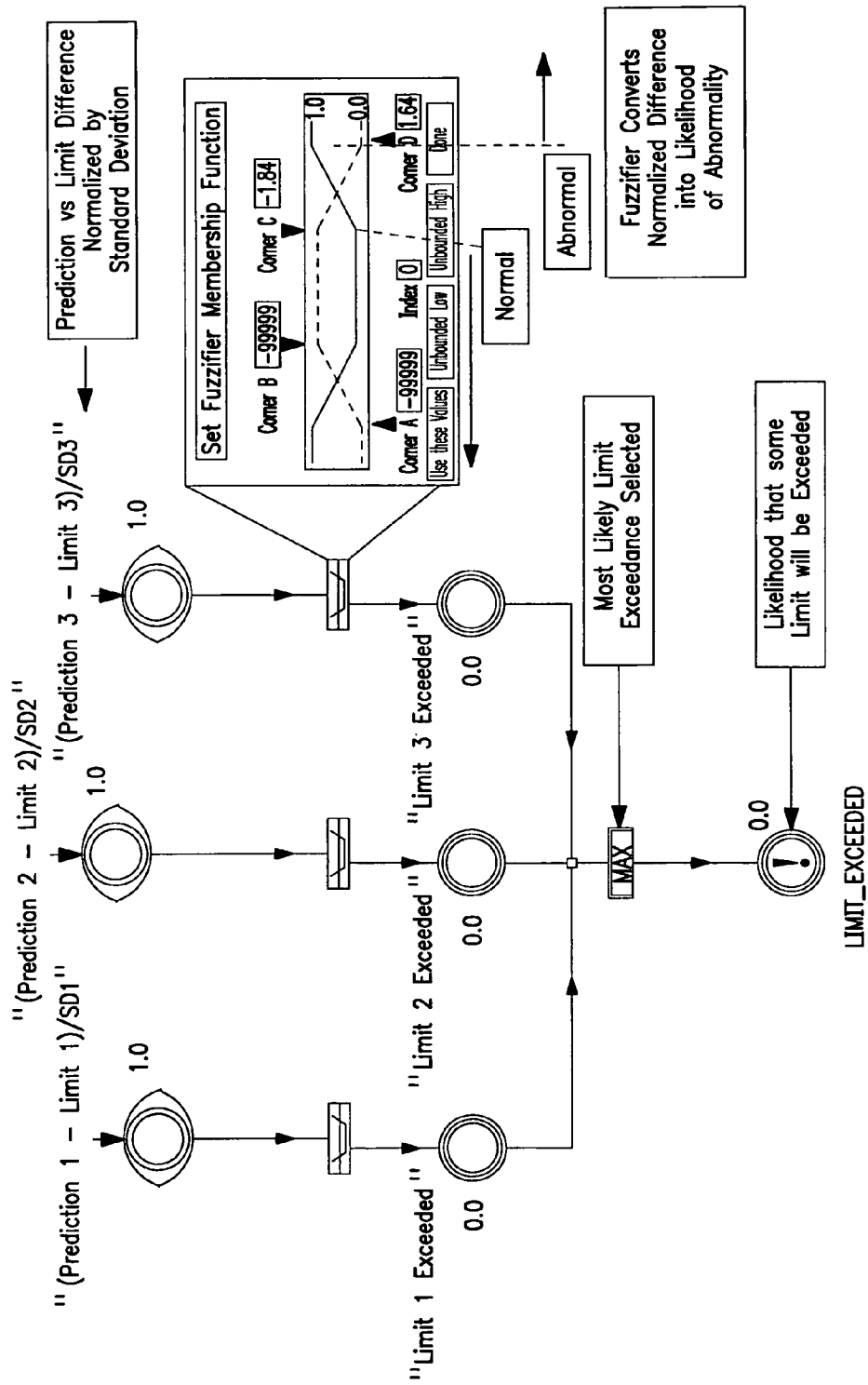
FIG. 6 shows a fuzzy net for summarizing likelihood of quality limit exceedance. This figure shows how multiple predictions of abnormal limit exceedances can be merged together into a single common trend display which summarizes the likelihood of an abnormal limit exceedance.

The fuzzy net shown in FIG. 6 shows how this method is implemented in the online system. The inputs to the fuzzy net are the normalized differences between the $Y_{predicted}$ and the upper quality limit.

$$\frac{(Y_{predicted} - \text{Upper Limit})}{\text{Standard } Deviation_{quality\ estimate\ residual}} \qquad \text{Equation 12}$$

The fuzzifier converts this value into the likelihood of a future limit violation based on the likelihood table. A 100% likelihood estimate of operation within the quality limit occurs when $Y_{predicted}$ is below 1.83 standard deviations below the upper quality limit. A 100% likelihood estimate of exceeding the upper quality limit occurs when $Y_{predicted}$ is higher than 1.64 standard deviations above the upper quality limit. Whereas these corner point values are not strictly true, these values allow the fuzzifier to correctly calculate the likelihood of 60% at 0.255 standard deviations (the point at which the operator would get his first notification) and 90% at 1.3 standard deviations.

Checking the Raw Bias for Model Problems/Calibration Drift

A problem with the model or a long term calibration drift is visible in the Raw Bias value. These two types of problems can be difficult to impossible to distinguish from each other. Assuming the model is commissioned with a good estimation ability, model problems can come from a change in some factor that truly affects the quality value but was not included in the model or a change in the correlation structure or in the time dynamic relationship among the inputs and the output due to a change in the process operating conditions. Calibration drift can affect either/both the zero and the span of the measurement.

Detection of these issues is done by checking for a statistically significant change in the Raw Bias which persists or which cycles above and below the statistical significance limits. Similarly to detecting quality analysis measurement problems, one check for these problems is when the value for the Raw Bias moves outside of its normal range, and stays outside that range for several hours. The cyclic check counts the number of times the Raw Bias exceeds statistical significance limits. The statistically normal range for the Raw Bias can be calculated from its standard deviation during normal operations. A common definition of the "normal range" would be the limits between which 99.9% of the data would lie. This set of limits would correspond to approximately 3.5 standard deviations away from zero, which is the expected mean of the Raw Bias. These limits can be tuned to provide more or less sensitivity.

Once the statistical limits remain violated, the operator would be instructed to have the instrument technician check the analyzer with a calibration sample and recalibrate the analyzer if necessary.

D. Operator Interface Displays

Figure 7:
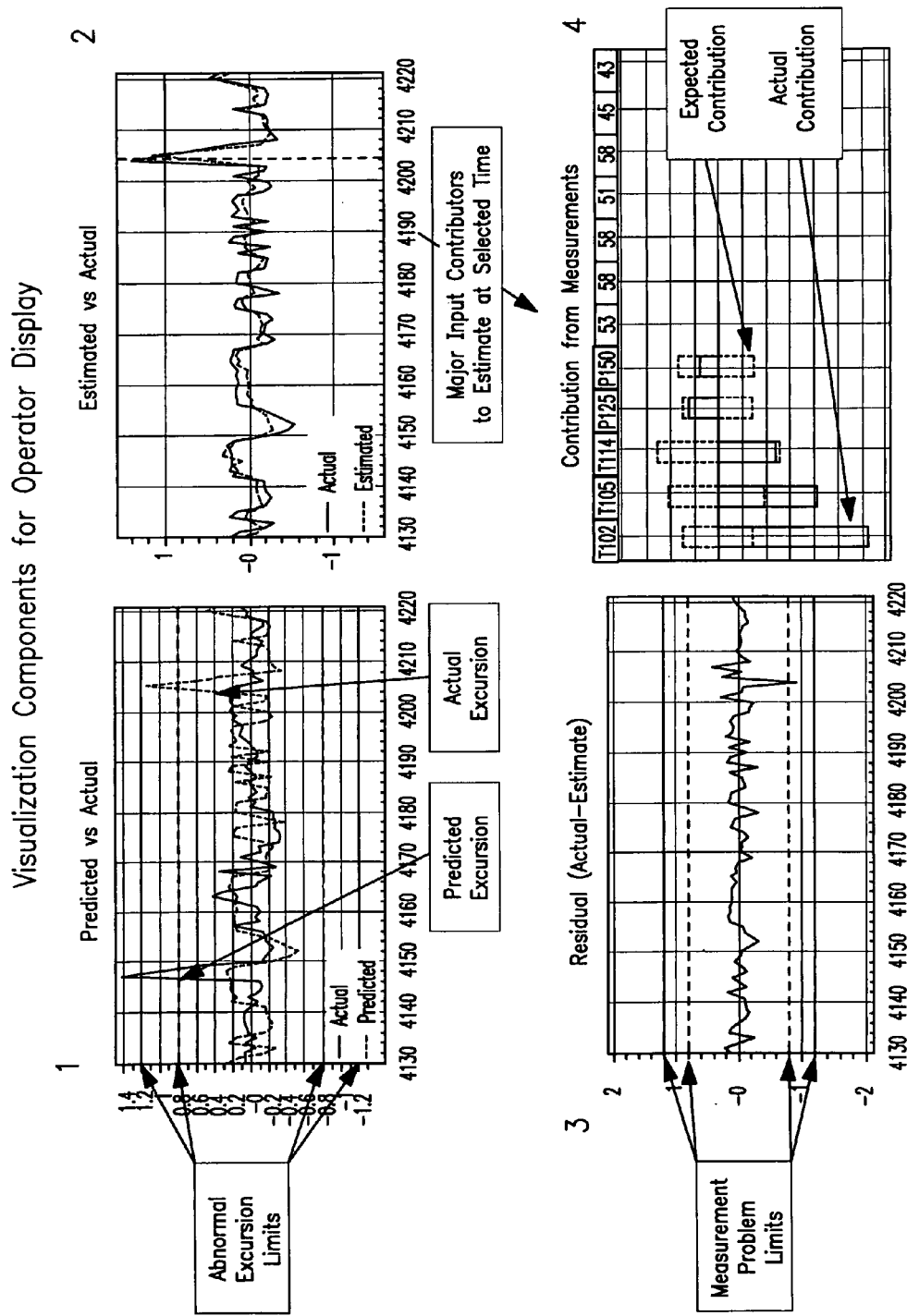
FIG. 7 shows the visualization components for operator displays. This figure shows the primary operator displays for the on-line system to help the operator diagnose a potential abnormal event.

The objective of the operator displays is to notify the operator that a potential abnormal event has been detected, then to quickly provide the supporting information needed by the operator to diagnose the situation. This information is provided through a set of trends and contribution bar charts shown in FIG. 7.

Trend 1 shows the information to inform the operator of the likelihood of a future abnormal quality excursion. In this example trend, an excursion is predicted to occur around time 4145. The dotted line corresponds to a 60% likelihood of an excursion while the solid line corresponds to a 90% likelihood of an excursion. In this example the excursion does occur as predicted, but not quite to the extent predicted.

Trend 2 shows the estimated analyzer value compared to the actual analyzer value. In addition to instilling confidence in the operator in the quality of the estimate, this trend is valuable should the actual analyzer fail and the operator needs to know the estimated value.

Trend 3 shows the operator if the difference between the estimated value and actual value is statistically significant. The dotted line corresponds to a 60% likelihood of an analyzer problem while the solid line corresponds to a 90% likelihood of an analyzer problem.

Bar chart 4 shows which measurements are indicating the change in the analyzer value from its average value. These inputs are arranged in decreasing order of their contribution to the estimate of the change in the analyzer value. The contribution from each model input to the calculated analyzer change is derived from this variation on Equation 5.

$$(Y_N - Y_{N,filt}) = A_1^*(X_{1,N} - X_{1,N,filt}) + A_2^*(X_{2,N} - X_{2,N,filt}) + \ldots A_k^*(X_{k,N} - X_{k,N,filt})$$ Equation 13

So the size of the solid bar associated with input $X_j$ is:

$$\text{Solid Bar Size}_{j,N} = A_j^*(X_{j,N} - X_{j,N,filt})$$ Equation 14

And the size of the dotted reference box (indicating expected contribution) is the standard deviation of this term from the training dataset $$\text{Dotted Box Size}_j = \text{Standard Deviation}(A_j^*(X_{j,N} - X_{j,N,filt}))_{\text{Training Data}}$$ Equation 15

III. Developing the Inferred Quality Models

The key to developing an accurate model is to have a high quality training data set. The characteristics that determine a high quality training dataset are:

Exhibits good signal to noise ratio in the training data

Includes all measurable effects on the analysis

Figure 1:
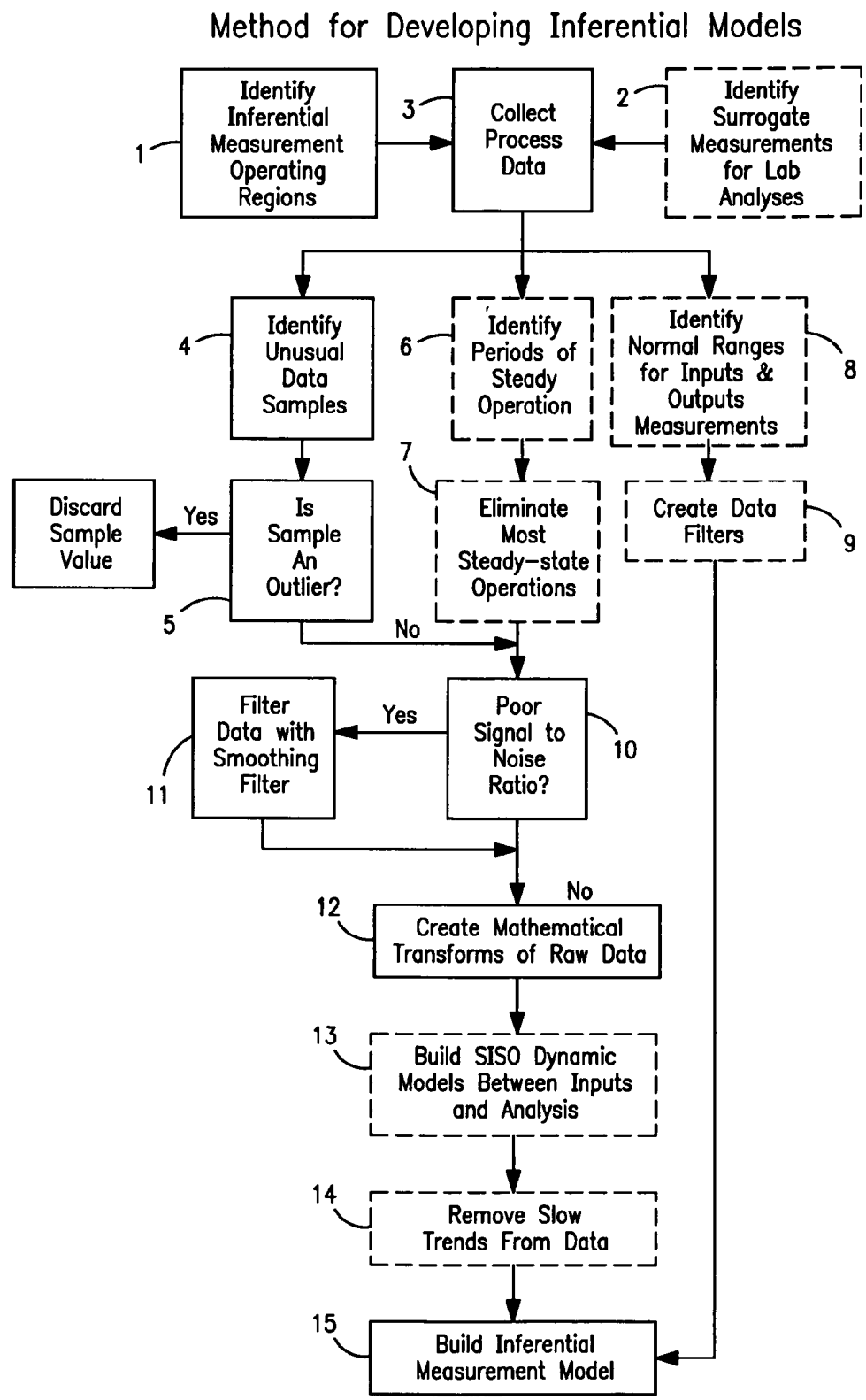
FIG. 1 shows a method for developing inferential models. This figure shows the major steps for the method portion of the invention. The solid boxes represent the prior art steps while the dotted line boxes represent the areas covered by this invention.
Figure 8:
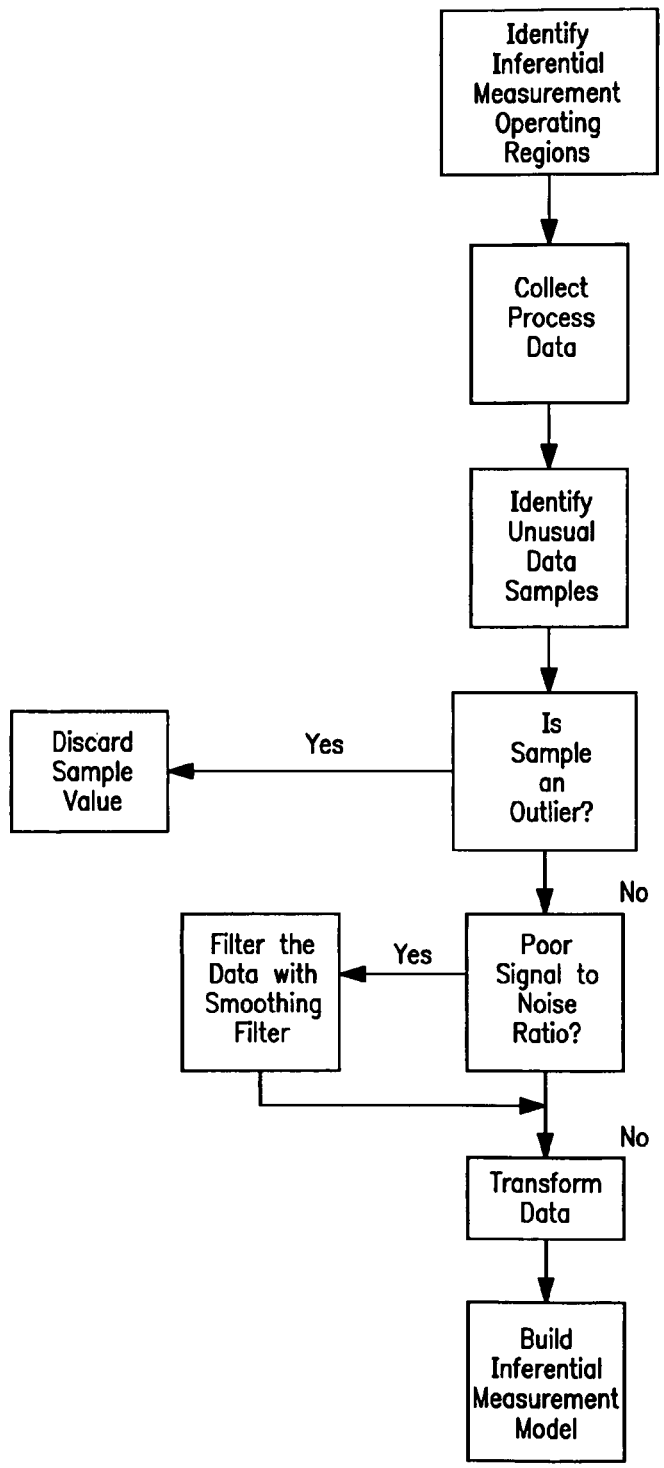
FIG. 8 shows a typical prior art method for developing inferential models. This figure shows the major steps for a typical prior art method for developing inferential models.

Includes appropriate mathematical transforms of the raw data, in particular those needed for time synchronization Includes annotations of unusual process operations Includes ancillary indications of process/control system configuration Spans the operating range of interest Includes a balanced representation of the various operating points Excludes bad data (outliers) which don't represent the actual process condition FIG. 8 represents a typical prior art method to develop inferential models, while the FIG. 1 show the extensions to the standard method necessary for abnormal event detection and compensating for process time dynamics and cross-correlated model inputs. The following describes the methodology for each step of the methodology shown in FIG. 1. The following paragraphs are numbered to correspond to the numbered boxes in FIG. 1.

1. Identify Inferential Measurement Operating Regions

This step involves identifying when the historical process operations were relevant to the planned inferential model development and which operating modes the model will apply to. Because these models are empirical, they rely on the correlation structure in the data. That correlation structure can change depending on the operating mode. At this stage it is necessary to identify which operating modes exist in the operation and when the process was operating in that operating mode. Later during the model building stage, there will be the need to decide which of these operating modes can be combined to reduce the total number of models needed to cover the operation. In addition there may be equipment configuration modes that could affect the quality measure.

Continuous industrial processes go through infrequent periodic turnarounds for required maintenance. During a turnaround, a site may choose to upgrade their process equipment for debottlenecking or other reasons. This type of process change can make any data from pre-turnaround operations useless for model development. Consequently, the date of any significant mechanical change to the process, or major change to the process control strategies must be noted as the earliest time that data can be gathered for model development.

2. Identify Surrogate Measurements for Lab Analyses

This step involves selecting an on-line measurement that can "substitute" for an offline quality measurement for the purposes of calculating the time synchronization. Because laboratory samples are taken infrequently, we need to rely on a similar on-line measurement that can be expected to change at the same time as the laboratory measurement. For example the 95% boiling point is highly correlated with the final boiling point, FBP. The FBP inferential model can be expect to use measurements which are highly correlated to the 95% boiling point and the time synchronization between these highly correlated measurements and the 95% boiling point is assumed to be the same as the time synchronization with the FBP.

When selecting a surrogate on-line measurement, it is important to note whether the automatic sample point for the on-line analyzer is physically close to the manual sample point for the laboratory analysis. As these two sample points are located further and further apart, it will introduce greater and greater error in the time synchronization. If the physical separation is only a length of pipe, this can be corrected by adding to (manual sampling point downstream of the automatic sampling point) or subtracting from (manual sampling point upstream of the automatic sampling point) the time synchronization model, a deadtime equivalent to the volume of the intervening pipe divided by the normal process flow.

If the surrogate on-line measurement is also part of the laboratory analysis, the time shift due to different sample locations can be calculated by comparing the on-line measurement value to the laboratory measurement value.

3. Collect Process Data

This method allows the use of normal operating data to create the inferential models, thereby avoiding the cost of designed experiment tests of the process. Without the excitation of the process from designed experiments, the information needed to build the model comes from process upsets and operating point changes.

Continuous industrial processes operate primarily at a limited number of steady state operating points. These steady periods of operation contribute little information on the relationship among the process measurements. Consequently, long stretches of operating data will need to be collected (e.g. 6 months-2 years) in order to capture a sufficient number of process events to model these measurement relationships. Process history systems store many years of data, often at a high resolution, so they are the likely source for the data.

Typically the raw on-line measurement data should be collected as spot values, without any data compression, at a frequency of around once per minute. In addition to measurements which are candidates for inclusion in the model, variables which are indicators of process performance, of process operating modes, of equipment configurations, and of process control configuration should be collected.

Annotations of unusual process events or major disturbances should also be collected with the process measurement data.

4. Identify Unusual Data Samples

It is common for there to be a significant number of bad values in the data. Common things to identify are: saturated/off-scale measurements, instrument calibrations, historian system data gathering failures. Moderate to severe process disturbances will not normally be classified as unusual data unless they cause the process operations to be shut down or otherwise severely changed.

5. Evaluate: Is the Sample an Outlier

A data sample should be judged an outlier only if the value does not represent the actual process condition being measured (e.g. process was operating outside the range of the transmitter). Any time period where the quality measurement is bad would need to be discarded. However, since only a small number of the candidate model inputs will ultimately be included in the model, the sample times that can be included in the model training data will change depending on the particular set of inputs being evaluated.

6. Identify Periods of Steady Operation

Only a limited amount of data from periods of steady operation will be included in the training dataset. Where there are several common steady operating points, a similar amount of data should be selected from each steady operating point. The total amount of data from steady operations should typically be around 25% of the total data set.

7. Eliminate Most Steady State Operations

A data filter can be constructed to algorithmically identify and eliminate steady operations. Most common is to base this data filter on the rate of change, ROC, in the quality value or other key operating performance indicator. Such a data filter can be constructed by calculating:

$$ROC_N = Y_N - Y_{N,filtered} \qquad \text{Equation 16}$$

Where $Y_{N,filtered}$—low pass filtered value of $Y_N$

Data Filter—Exclude Low Limit $\leq ROC_N \leq$ Upper Limit

The term $Y_{N,filtered}$ acts as an estimate of the current average operating point. Subtracting $Y_N$, filtered from the current value $Y_N$ converts this data series into a stationary series, $ROC_N$, with an average value near zero. Values of $ROC_N$ near zero represent steady operations and have little information content. A common choice for the Low Limit and the Upper Limit would be:

Low Limit=—Standard Deviation ROC

Upper Limit=+Standard Deviation ROC

In this way most of the steady operations have been eliminated.

Figure 9:
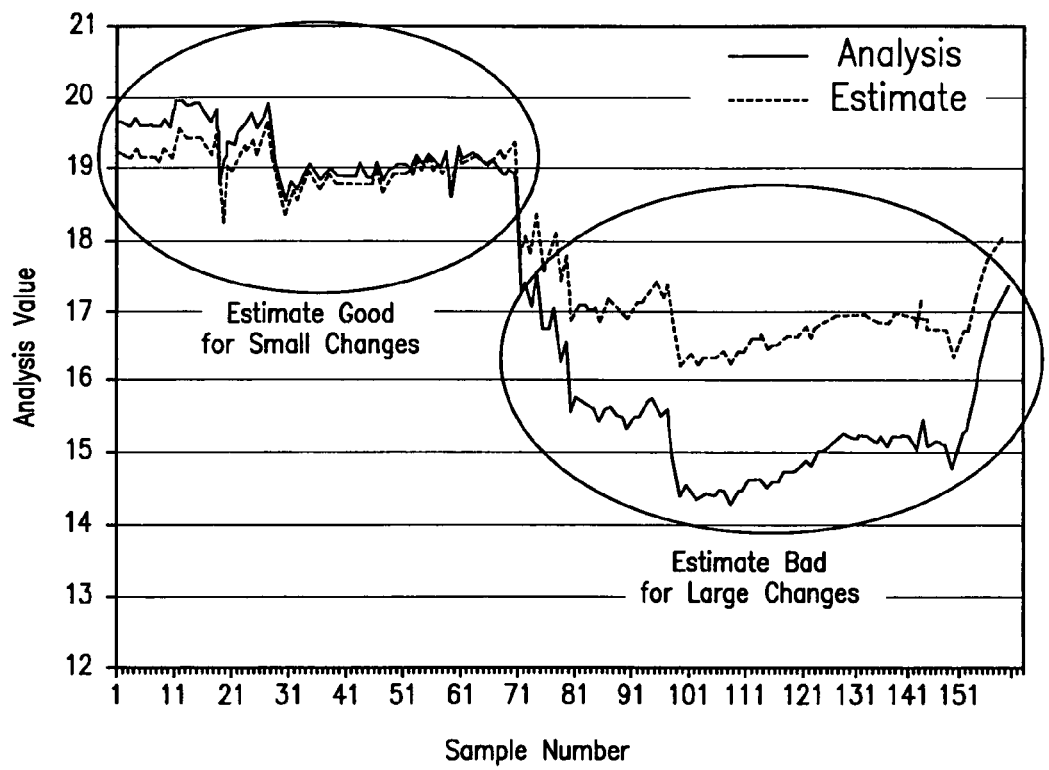
FIG. 9 shows an example of effect of not excluding steady state operations from training data. This figure is an example of how the failure to exclude data from steady state operations could affect the estimates from the inferential model.

FIG. 9 shows the effect of failing to eliminate the steady operations. The resulting inferential model could show good estimating properties when the changes are small, but poor estimating properties when changes are large.

8. Identify Normal Ranges for Inputs and Outputs

These ranges are identified for the purpose of algorithmically excluding data where a measurement may be saturated (e.g. outside the transmitter range) or where the process is operating in a region of highly non-linear operation (e.g. tower flooding as indicated by high tower delta pressure). This information will also be used in the gross error detection calculation in the online system.

9. Create Data Filters

In addition to the filters mentioned previously, additional data filters can be create to automatically exclude data during times of very unusual operations.

10. Evaluate: Poor Signal to Noise Ratio

A poor signal to noise ratio can be caused by a lack of a strong signal in the data, often caused by good process control keeping the measurement near its setpoint. Or by an excessive amount of noise in the signal. Where it is caused by a lack of signal strength, these measures are best left out of the model.

11. Filter Data with Smoothing Filters/Spike Filters

The most common filters needed are spike filters, mid-pass filters and, low pass filters. The spike filters often restrict a measurement change to a preset maximum change. Any filters that are applied to the data need to be reproduced in the on-line system, so they need to be physically realizable. The filter should be chosen to minimize phase lag.

12. Create Mathematical Transforms of Raw Data

To improve the fit of the models, a number of well known transformations are employed including: log transformation of composition analyzers and tower overhead pressures, conversion of flows to dimensionless ratios, and applying pressure compensation to tray temperatures.

13. Build SISO Dynamic Models

To handle the time dynamics in the data, a dynamic model between each candidate input and the analyzer value is developed. These are single-input, single-output models, SISO, and are typically simple first order plus deadtime models:

$$\frac{Y(s)}{X(s)} = G(s) = \frac{e^{-TD*s}}{Tau*s + 1} \qquad \text{Equation 17}$$

Where
X(s)—Laplace transform of the input signal
Y(s)—Laplace transform of the output signal
G(s)—symbol for the transfer function
$e^{-TD*s}$—Laplace transform for a pure deadtime of TD
Tau—time constant for a first order ordinary differential equation
s—Laplace transform parameter It is neither necessary nor desirable to develop a multi-input single-output, MISO dynamic model. Because the inputs are usually cross-correlated, MISO modeling results are significantly influenced by the particular set of inputs selected for a modeling case run.

14. Remove Slow Trends and Biases from the Data

If there are no persistent unmeasured load disturbances in the data, the coefficients from modeling differential data should be similar to the constants from modeling the full valued data. Persistent unmeasured load disturbances can severely bias a model. To avoid this bias problem, models will be developed using a form of differential data instead of the full valued data.

The particular manner for performing this transform is to use a low pass filter, such as an exponential filter, and subtract the filtered value from the current value:

$$\hat{Y}_N = Y_N - Y_{N,filtered} \qquad \text{Equation 18}$$

$$Y_{N,filtered} = (1-a)*Y_N + a*Y_{N-1,filtered} \qquad \text{Equation 19}$$

$$\hat{X}_{i,N} = X_{i,N} - X_{i,N,filtered} \qquad \text{Equation 20}$$

$$X_{i,N,filtered} = (1-a)*X_{i,N} + a*X_{i,N-1,filtered} \qquad \text{Equation 2}$$

Where
Y—quality measurement
$\hat{Y}$—quality measure with filtered value subtracted
$X_i$—candidate input i
$\hat{X}$—candidate input with filtered value subtracted
a—exponential filter constant (the same value for X and Y)

Figure 10:
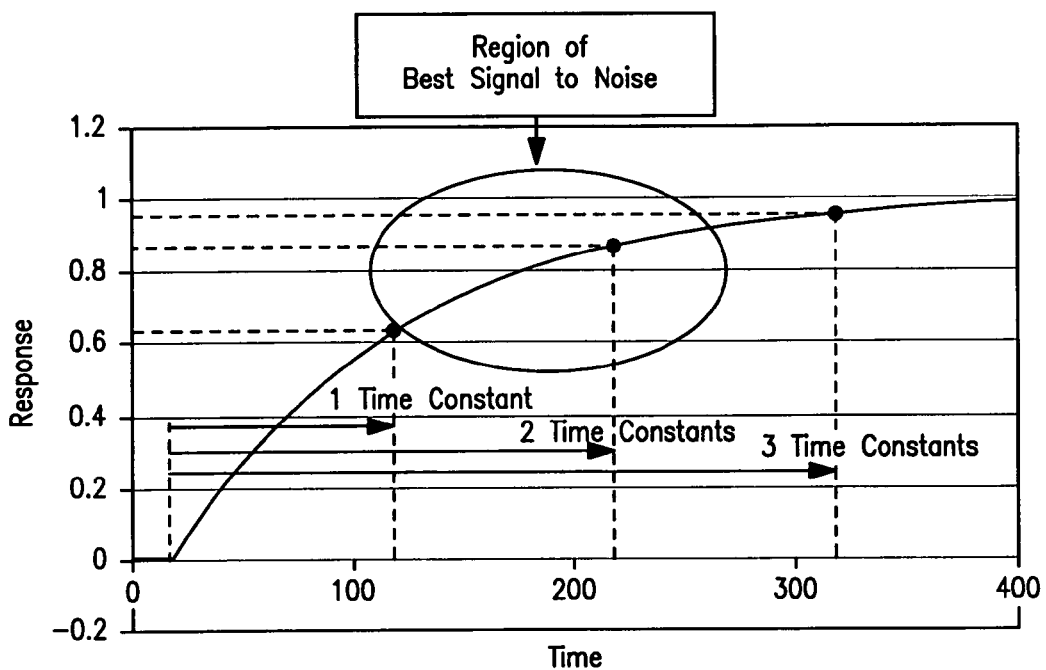
FIG. 10 shows dynamic response of a first order dead time process to a step change. This figure shows a dynamic response which is typical of the time dynamics encountered in continuous industrial processes.

The exponential filter constant should be selected to be between 1-3 times the dominant time constant of the process which affects the quality. This can be estimated from the SISO models built in step 13. As is shown in FIG. 10, the quality measurement will respond with 64% to 95% of its final response to a process change after 1-3 time constants respectively. Choosing time constants shorter than this will amplify the high frequency noise while decreasing the signal strength. Choosing time constants longer than this will amplify low frequency persistent disturbances. Filter constants in the 1-3 time constant range improve the signal to noise ratio the most.

15. Build the Inferential Model

Using the training dataset created in the previous steps, the inferential model can be built using standard model building tools and methods. The objective is to use the fewest number of inputs that will give a good inferential model. Referring to Equation 17 when selecting among alternate correlated inputs which have nearly equivalent estimating strength, selecting those with the largest values for Tau and TD will give the inferential model an earlier ability to predict an abnormal excursion and potentially better ability to control the process.

EXAMPLE

Figure 11:
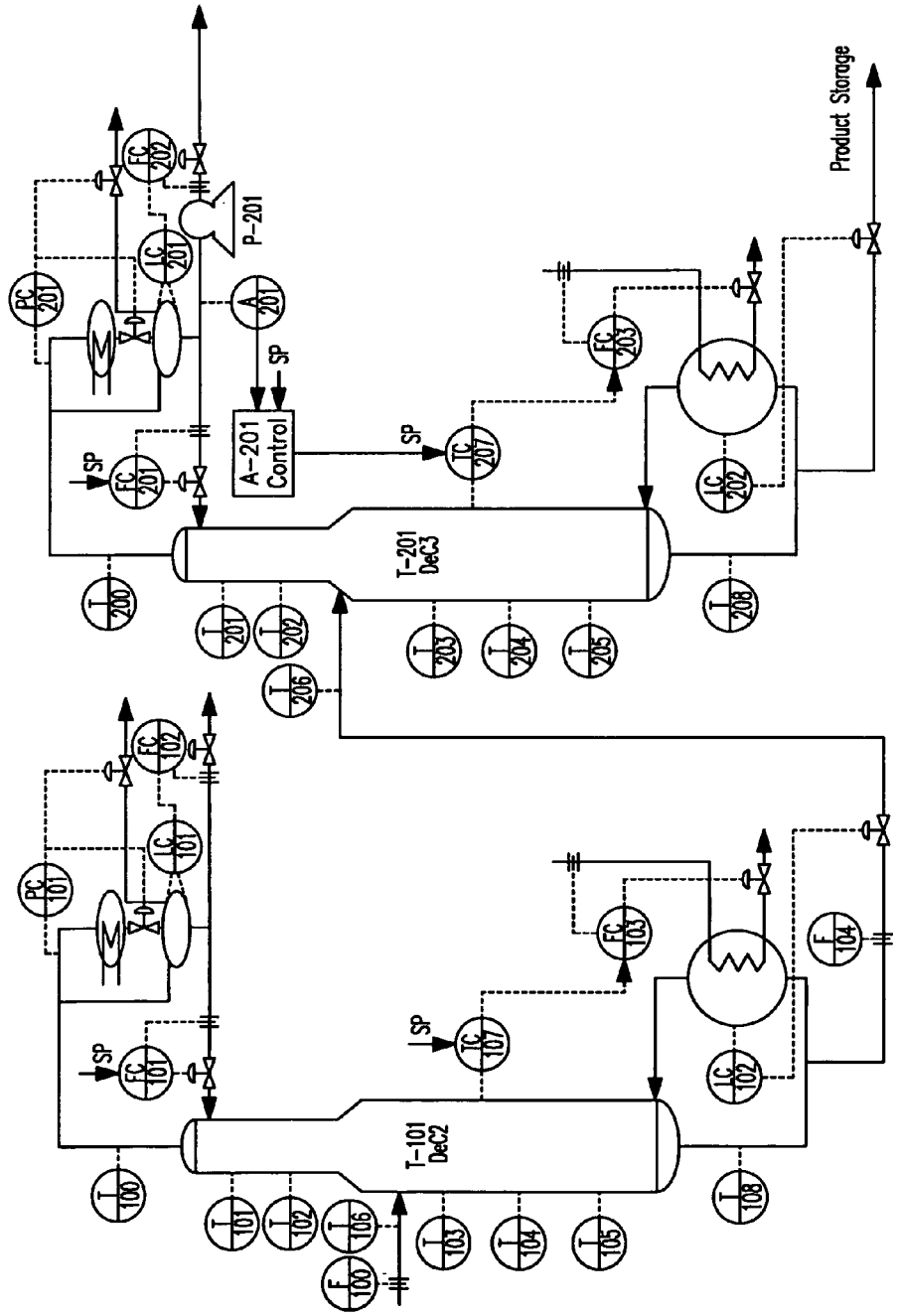
FIG. 11 shows a pair of distillation columns.
Figure 12A:
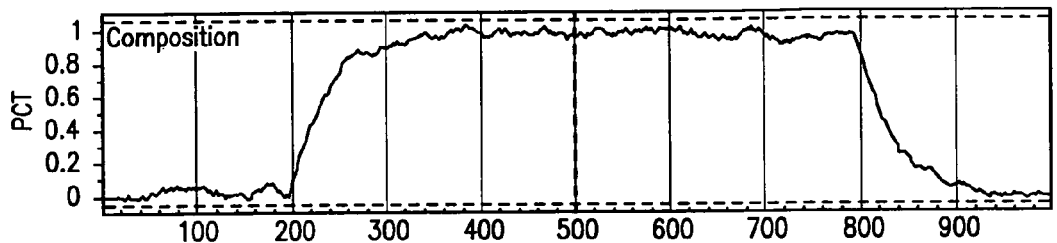
FIG. 12 shows a set time trends associated with partial plugging of the same line to the analyzer.
Figure 12B:
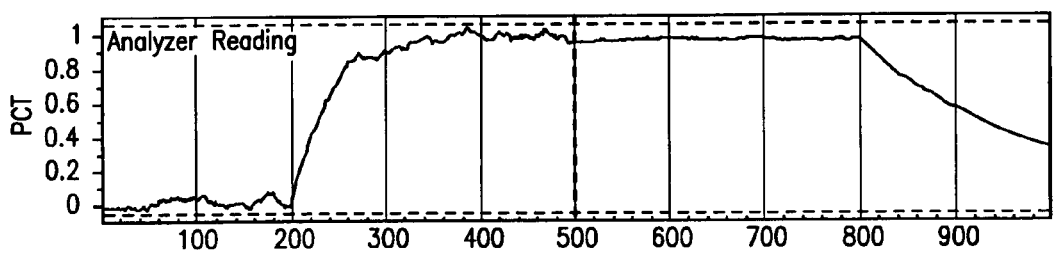
Figure 12C:
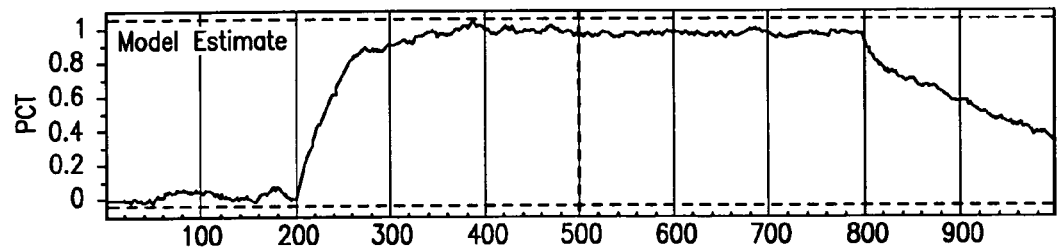
Figure 12D:
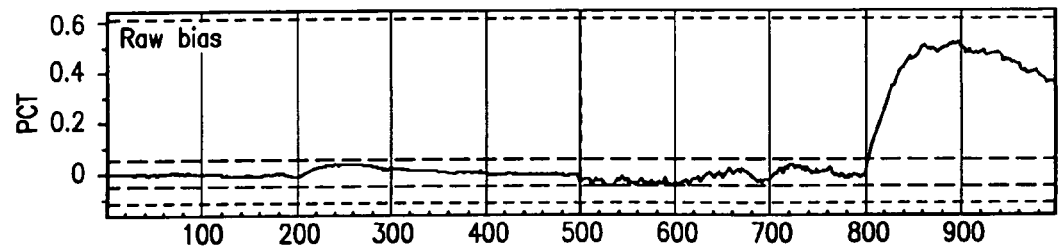
Figure 13A:
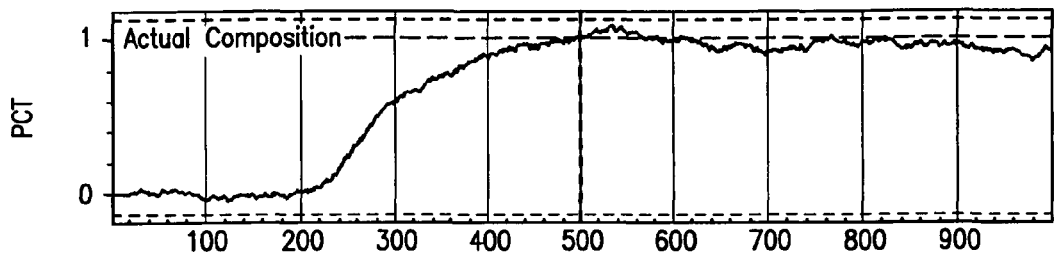
FIG. 13 shows a set time trends associated with drifting calibration of the analyzer.
Figure 13B:
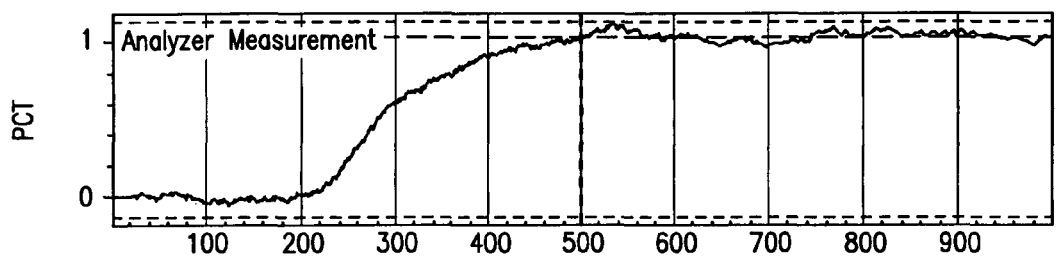
Figure 13C:
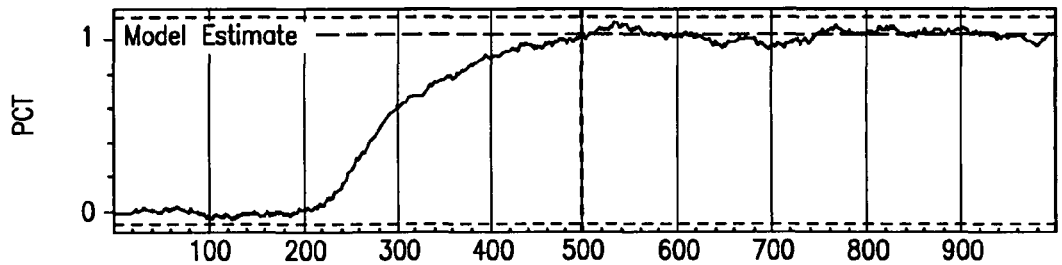
Figure 13D:
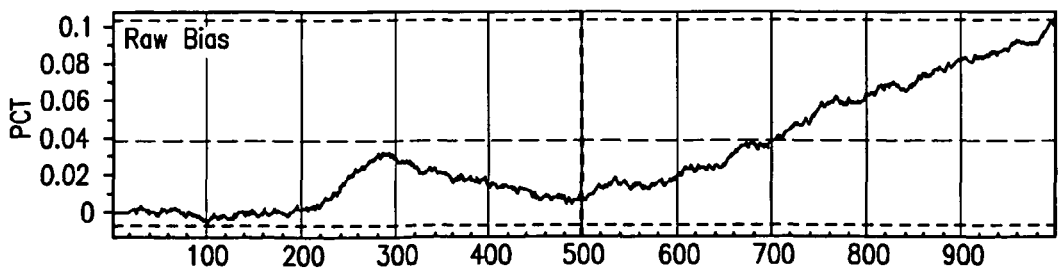

FIG. 11 shows a pair of distillation columns, where the first column, T-101, is designed to remove light hydrocarbons such as ethane, methane, and hydrogen, (known as a de-ethanizer) and the second column, T-201, is designed to extract $C_3$ hydrocarbons (primarily propane).

There are several abnormal events that need to be detected. Critical to the operation of tower T-201 is the composition of the distillate drawoff of T201, which is measured by analyzer A201 and controlled by an inferential controller "A-201 controller".

The first step in designing the inferential estimators for this application is to know the type of abnormal events we will be detecting. In this case, the estimators will identify problems with the analyzer operations, such as plugging of the analyzer sample loop or drifting in the analyzer calibration and will prevent cavitation of pump P-201 by predicting an excess of light hydrocarbon at the suction of pump P-201.

For detecting analyzer problems, the inferential would be built following current industry practice from measurements of the temperatures, pressures and flows of T-201. Analyzer problems are revealed by combining the time trends of the "raw bias", the analyzer signal and the model estimate.

FIG. 12 shows a set time trends associated with partial plugging of the sample line to the analyzer. In this example the plug develops around sample time 500, indicated by the dashed vertical lines on the plots, but only minor symptoms (lower than normal variability of the analyzer signal, FIG. 12B) is apparent in the data. While it is industrial practice to validate analyzer signals by requiring a minimum change between sample values, the low variation shown in this example would likely not trigger that type of validation check.

Between sample time 500 and sample time 800, the plugged sample reading and the actual composition match quite closely, only because the process composition has not changed significantly since the plug had developed and is operating around the composition setpoint. This situation represents a hidden trap to the operations.

The plug only has an impact when the composition begins moving significantly at sample time 800. After sample time 800, the analyzer value and the model estimate match fairly closely because of the bias updating portion of the model estimate algorithm, however both are wrong. Because the analyzer and the model estimate are confirming each other, the closed loop control or any operator actions would be based on this mis-information. Since the plug is partial, some of the process fluid is leaking through to the analyzer, allowing the analyzer to move slowly in the direction of the actual composition.

The situation becomes immediately obvious when analyzing the "raw bias" signal. A statistically significant change is determined in this case as a "raw bias" change greater than three standard deviations and is shown by the dotted horizontal lines on FIG. 12D. The exact value for this setting is tuned to avoid false indications by examining the long term history of the "raw bias" and can typically range between three and five standard deviations depending on the historical signal characteristics.

FIG. 13 shows a set time trends associated with drifting calibration of the analyzer. In this example an eventual 10% drift develops around sample time 500, indicated by the dashed vertical lines on the plots, but no symptoms are apparent in the analyzer (FIG. 13B) or model estimate (FIG. 13C) data.

The situation gradually becomes obvious when analyzing the "raw bias" signal. A statistically significant change is reached by sample time 720 and is determined in this case as a "raw bias" change greater than three standard deviations as is shown by the dotted horizontal lines on FIG. 13D. The exact value for this setting is tuned to avoid false indications by examining the long term history of the "raw bias" and can typically range between three and five standard deviations depending on the historical signal characteristics.

In contrast to detecting analyzer problems, predicting the composition at the suction of P-201 requires a different selection of process measurements in order to get sufficient lead time to prevent the cavitation of the pump. Once the measurements in T-201 indicate an increase in the light hydrocarbons in the T-201 feed, it is difficult to prevent the pump cavitation since the light hydrocarbons are already in T-201 and the only way to get them out of the tower is through the overhead of the tower.

Instead the design of the inferential estimator should rely on the measurements in T-101 to provide the additional lead time indicating excessive light hydrocarbons in the feed to T-201. As the selection of input measurements moves further upstream, the accuracy of the inferential estimator will likely deteriorate, making this selection of input measurement less desirable for detecting analyzer problems as discussed earlier.

| Patent Citations | | |
|---|---|---|
| US3773627(A) | Mosler, Henry A & Weber, Richard, Temperature Control of Distillation | Nov-73 |
| US3855074(A) | Mosler, Henry A & Weber, Richard, Pleural Temperature Controls of Distillation | Dec-74 |
| US5386373(A) | Keeler, James D., Havener, John P., Godbole, Devendra, Ferguson, Ralph B, Virtual continuous emission monitoring system with sensor validation | Jan-95 |
| US5548528(A) | Keeler, James D., Havener, John P., Godbole, Devendra, Ferguson, Ralph B, Virtual continuous emission monitoring system | Aug-96 |
| US5680409(A) | Qin, S. Joe, Dunia, Ricardo H., Hayes, Randall L., Method and apparatus for detecting and identifying faulty sensors in a process | Oct-97 |
| US6356857(B1) | Qin, S. Joe, Guiver, John P, Sensor validation apparatus and method | Mar-02 |
| US6471823(B1) | Stewart, Wade C. Use of pressure and temperature measurements to infer process variables and to monitor equipment conditions and infer process efficiency in a multi-effect evaporator systems | Oct-02 |
| US6519552(B1 | Sampath, Meera, Godambe, Ashok, Jackson, Eric. Mallow, Edward W.. Systems and methods for a hybrid diagnostic approach of real time diagnosis of electronic systems | Feb-03 |
| US6556939(B1) | Wegerich, Stephan W, Inferential signal generator for instrumented equipment and processes | Apr-03 |
| US6594620(B1) | Qin, S. Joe, Guiver, John P., Sensor validation apparatus and method | Jul-03 |
| US6772099(B2) | Merkin, Cynthia M., Gerhart, Donald W., Weilnau, Jr., Wayne R., Blanton, Jr., Allen M., Chidester, Philip D., Khatri, Mukund P, System and method for interpreting sensor data utilizing virtual sensors | Aug-04 |
| US6804600(B1) | Uluyol, Onder, Nwadiogbu, Emmanuel O., Sensor error detection and compensation system and method | Oct-04 |
| US6876943(B2) | Wegerich, Stephan W., Inferential signal generator for instrumented equipment and processes | Apr-05 |
| US6904391(B2) | Merkin, Cynthia M., Gerhart, Donald W., Weilnau, Jr., Wayne R., Blanton, Jr., Allen M., Chidester, Philip D., Khatri, Mukund P, System and method for interpreting sensor data utilizing virtual sensors | Jun-05 |
| WO9504957(A1) | Keeler, James D., Havener, John P., Godbole, Devendra, Ferguson, Ralph B, Virtual continuous emission monitoring system with sensor validation | Feb-95 |
| US20040133398 (A1) | Merkin, Cynthia M., Gerhart, Donald W., Weilnau, Jr., Wayne R., Blanton, Jr., Allen M., Chidester, Philip D., Khatri, Mukund P, (Dell Products LP), System and method for interpreting sensor data utilizing virtual sensors | Jul-04 |
| US20040254767 (A1) | Merkin, Cynthia M., Gerhart, Donald W., Weilnau, Jr., Wayne R., Blanton, Jr., Allen M., Chidester, Philip D., Khatri, Mukund P, (Dell Products LP), System and method for interpreting sensor data utilizing virtual sensors | Dec-04 |
| US20060058898 (A1) | Emigholz, Kenneth, F., Wang, Robert, K., Woo, Stephen, S., McLain, Richard, B., Dash, Sourabh, K., Kendi, Thomas, A. System and method for | Mar-06 |

| | -continued | |
|---|---|---|
| | Patent Citations | |
| WO2006031635 (A2) | abnormal event detection in the operation of continuous industrial processes Emigholz, Kenneth, F., Wang, Robert, K., Woo, Stephen, S., McLain, Richard, B., Dash, Sourabh, K., Kendi, Thomas, A. System and method for abnormal event detection in the operation of continuous industrial processes | Mar-06 |
| WO2006031749 (A2) | Emigholz, Kenneth, F., Dash, Sourabh, K., Woo, Stephen, S., Application of Abnormal Event Detection Technology to Fluidized Catalytic Cracking Units | Mar-06 |
| WO2006031750 (A2) | Emigholz, Kenneth, F., Kendi, Thomas, A., Woo, Stephen, S., Application of Abnormal Event Detection Technology to Hydrocracker Units | Mar-06 |

EXTERNAL LITERATURE CITATIONS (1) Cardoso, J. et al "Fuzzy Petri Nets: An Overview", 13th Word Congress of IFAC, Vol. I: Identification II, Discrete Event Systems, San Francisco, Calif., USA, Jun. 30-Jul. 5, 1996, pp. 443-448

(2) Erbay, A. S. & Upadhyaya, B. R. "A Personal Computer Based On-Line Signal Validation System for Nuclear Power Plants", Nuclear Technology, Vol 119, pp 63-75, July 1997

(3) Gertler, J., "Survey of Model-Based Failure Detection and Isolation in Complex Plants," *IEEE Control Systems Magazine*, pp. 3-11 (December 1988)

(4) Gertler, J. et al., 'Isolation Enhanced Principal Component Analysis,' AIChE Journal, Vol 45 Issue 2, pp 323-334, 1999

(5) Gross, K. C., et al, "Application of a Model-Based Fault Detection System to Nuclear Plant Signals," International Conference on Intelligent System Application to Power Systems, Jul. 6-10, 1997, Seoul, Korea pp. 66-70

(6) Hobert, K. E., & Upadhyaya, B. R. "Empirical Process Modeling Technique for Signal Validation", Annals of Nuclear Energy, Vol. 21, No. 7, pp 387-403, 1994

(7) Long, T; et al; "Sensor Fusion and Failure Detection Using Virtual Sensors"; Proceedings of the 1999 American Control Conference; vol. 4; June 1999; pp 2417-2421

(8) Lorber, A, et al, "A Theoretical Foundation for the PLS Algorithm", Journal of Chemometrics, Vol. 1, pp 19-31, 1987

(9) Manus, H., "Validating Data from Smart Sensors" Control Engineering, pp. 63-66, August 1994

(10) Martens, H., & Naes, T., "Multivariate Calibration", John Wiley & Sons, 1989

(11) Piovoso, M. J., et al. "Process Data Chemometrics", IEEE Trans on Instrumentation and Measurement, Vol. 41, No. 2, April 1992, pp. 262-268

(12) Qin, J. S, and Li, W., Detection, identification, and reconstruction of faulty sensors with maximized sensitivity, AIChE Journal, Vol 45 Issue 9, pp 1963-1976, 1999

(13) Sowizral, H; "Virtual Sensors"; Proceedings SPIE International Society for Optical Engineering; vol. 2409; Feb. 7-9, 1995; pp 246-254

(14) Spoelder, H; "Virtual Instrumentation and Virtual Environments" IEEE Instrumentation and Measurement Magazine; vol. 2, Issue 3; September 1999; pp 14-19

(15) Tsoukalas, L. S., & Uhrig, R. E. "Neural and Fuzzy Systems in Engineering", John Wiley, New York, 1996

(16) Upadhyaya, B. R., et al "Multivariate Statistical Signal Processing Techniques for Fault Detection and Diagnosis", ISA Transactions, Vol. 29, No. 4, pp 79-95, 1990

(17) Venkatasubramanian, V, et al "A Review of Process Fault Detection and Diagnosis", Parts 1, 2, & 3, Computers and Chemical Engineering, vol 27, 2003

What is claimed is:

1. An on-line system for calculating inferential estimators of key process conditions from normal process operating data of petro-chemical and industrial processes comprising:
   a) real-time data collector,
   b) real-time data preprocessor,
   c) steady state and/or dynamic inferential models wherein said models estimate values for the current quality value ($Y_{estimate}$) and predict abnormal values for the future quality value ($Y_{predicted}$), and the inputs to said inferential models for calculating ($Y_{predicted}$) are not time synchronized,
   d) statistical significance calculator of estimates of the models,
   e) means for summarizing multiple model results, and
   f) predictive displays for future abnormal events of said continuous petro-chemical and industrial process, and
   g) diagnostic displays for event analysis.

2. The system of claim 1 wherein said data collector measures process measurements as inputs to the model.

3. The system of claim 2 wherein said process measurements include temperature, pressure, and flow rates.

4. The system of claim 1 wherein said data preprocessor includes a gross error detection of the data.

5. The system of claim 1 wherein data preprocessor includes mathematical transformation of the data.

6. The system of claim 1 wherein said data preprocessor includes a filter to remove noise.

7. The system of claim 1 wherein said inferential models and said statistical significance calculator determines the current operating parameter ($Y_{estimate}$), the future predicted operating parameter ($Y_{predicted}$), and long-term drift problems in either the model and/or raw measurements.

8. The system of claim 7 wherein said inferential models and said statistical significance calculator determines an estimate of the value of the operating parameter.

9. The system of claim 7 wherein said inferential estimator determines the predicted future value of the final steady state value of the operating parameter if all the inputs remain at their current level ($Y_{predict}$).

10. The system of claim 7 wherein said model and statistical significance calculator further determines the future operating parameter for process control application ($Y_{control}$).

11. The system of claim 7 wherein inputs to the model for $Y_{estimates}$ are time synchronized with the corresponding lab analysis or on-line analysis process measurements.

12. The system of claim 1 wherein said inferential model can be built using Kalman Filters, partial least squares, regression, neural nets and stepwise regression.

13. The system of claim 11 wherein said inferential model is a partial least squares model.

14. The system of claim 11 wherein said model includes a bias term.

15. The system of claim 14 wherein said bias term is updated whenever an on-line analysis or lab analysis of operating parameters is available.

16. The system of claim 1 wherein said statistical significance calculator determines whether a statistically significant difference exists between the output of the inferential estimator and the measurement corresponding to the output of the inferential estimator.

17. The system of claim 1 wherein said model and statistical significance calculator determines an estimate of the value of the operating parameter.

18. The system of claim 9 wherein said model determines future operating limit excursions by comparing the predicted value of the operating parameter to the operating limit.

19. The system of claim 1 wherein said inferential model includes the identification of surrogate measurements for laboratory analyses.

20. The system of claim 1 wherein said inferential model includes the identification of periods of steady operation and the elimination of most steady-state operations.

21. The system of claim 1 wherein said inferential model includes identification of normal ranges for inputs and outputs measurement.

22. The system of claim 1 wherein said inferential model includes data filters to exclude data during times of very unusual operations.

23. The system of claim 1 wherein said inferential model includes single-input, single-output models.

24. The system of claim 1 wherein said inferential model includes the removal of slow trends from the data.

25. The system of claim 5 wherein transformations are used to time synchronize input data.

26. The system of claim 9 wherein said estimator of the future predicted operating parameter ($Y_{predicted}$) is used to determine future operating limit excursions by comparing the predicted value of the operating parameter to the operating limits.

27. The system of claim 17 wherein the estimate includes a bias term.

28. The system of claim 27 wherein said bias term is updated with a measurement corresponding to the output of the inferential estimator.

* * * * *